United States Patent [19]

Steensma et al.

[11] 4,266,183

[45] May 5, 1981

[54] FAULT LOCATING ARRANGEMENT FOR A TWO-WAY REPEATERED TRANSMISSION LINK

[75] Inventors: Peter D. Steensma, Midland Park; Robert H. Haussmann, Wayne; Anton J. Polcer, Haledon, all of N.J.

[73] Assignee: International Telephone and Telegraph, New York, N.Y.

[21] Appl. No.: 60,439

[22] Filed: Jul. 25, 1979

[51] Int. Cl.³ .............................................. G01R 31/08
[52] U.S. Cl. ............................... 324/52; 179/175.3 F; 179/175.31 R
[58] Field of Search ................... 324/52; 179/175.3 F, 179/175.31 R

[56] References Cited

U.S. PATENT DOCUMENTS

| | | | |
|---|---|---|---|
| 3,649,777 | 3/1972 | Matsushima | 179/175.31 R |
| 4,041,381 | 8/1977 | Hwa | 324/52 |
| 4,211,920 | 7/1980 | Wakabayashi | 324/52 |

Primary Examiner—Michael J. Tokar
Attorney, Agent, or Firm—John T. O'Halloran; Alfred C. Hill

[57] ABSTRACT

A fault locating arrangement for a two-way repeatered transmission link comprising a source in one of the terminals to transmit a unique signal in a first transmission direction from the one of the terminals to the other of the terminals through the repeaters, and a first unique signal detector, a second unique signal detector and logic circuitry disposed in at least the other of the terminals and each of the repeaters. The first unique signal detector is coupled to the first transmission direction, the second unique signal detector is coupled to the opposite transmission direction and the logic circuitry is coupled to the first and second unique signal detectors such that, when the unique signal traveling in the first transmission direction is detected, a loop connection is established for the unique signal from the first transmission direction to the opposite transmission direction and the unique signal is transmitted in the first transmission direction beyond an associated one of the repeaters. The logic circuitry breaks the loop connection when the unique signal is detected traveling in the opposite transmission direction and maintains the loop connection when the unique signal is not traveling in the opposite transmission direction. A phase comparator disposed in the one of the terminals responds to the unique signal transmitted in the first transmission direction and received from the opposite transmission direction to provide an indication of the location of a fault in the transmission link.

19 Claims, 7 Drawing Figures

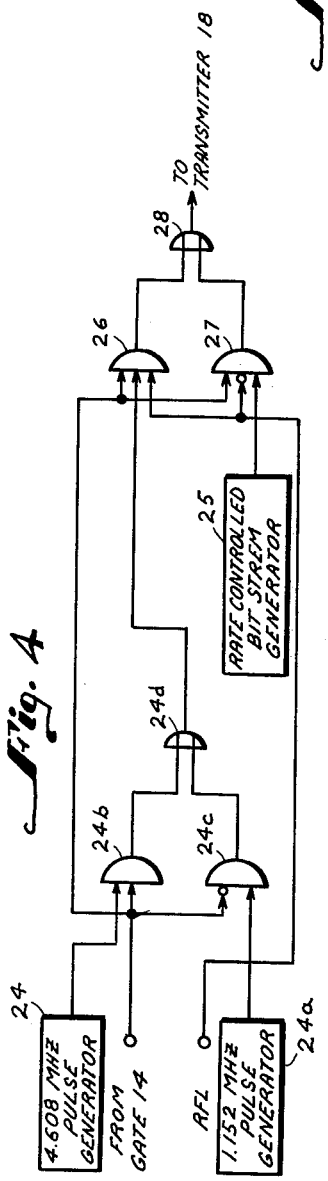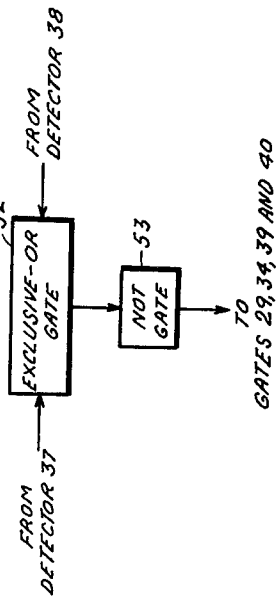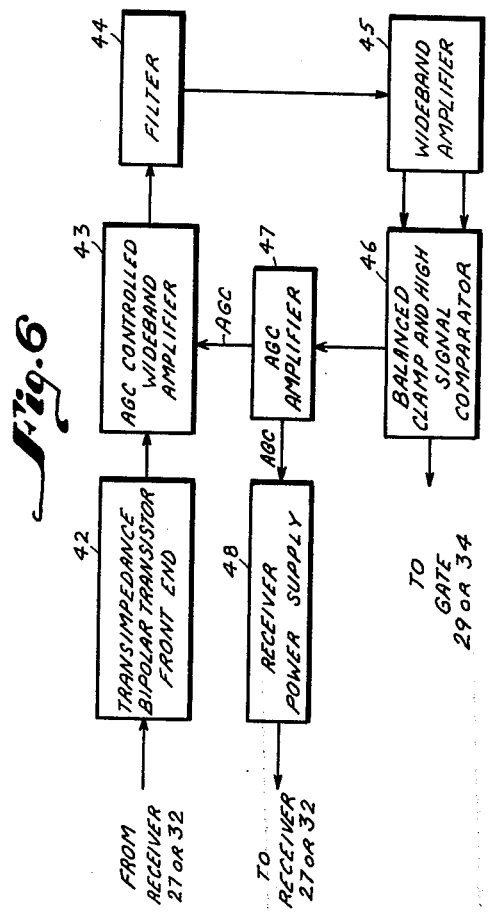

FAULT LOCATING ARRANGEMENT FOR A TWO-WAY REPEATERED TRANSMISSION LINK

BACKGROUND OF THE INVENTION

The present invention relates to two-way repeatered transmission links and more particularly to a fault locating arrangement therefore.

One known fault locating arrangement has in the past been employed with a full duplex (two-way) repeatered wireline transmission link with repeater power obtained from a direct current (d.c.) source line feed. The overall voltage drop of a looped-back current feed is used as an indication of the number of good repeaters in the repeatered transmission link. This is facilitated by circuitry in each repeater half section which detects the presence or absence of a good data signal and operates a relay which then controls the voltage drop in the d.c. current path.

The above technique for fault location is not applicable to a system which has no d.c. current path such as wireline repeatered transmission links which are not d.c. coupled, radio repeater links and optical cable links or combinations thereof.

SUMMARY OF THE INVENTION

An object of the present invention is to provide a quick, accurate and simple to operate fault locating system for two-way repeatered transmission links and in particular fiber optical cable links, radio repeater links and wireline links which are not d.c. coupled.

It should be noted that the fault locating arrangement of the present invention can also be employed with wireline transmission links that are d.c. coupled, either by itself or in combination with the prior art fault locating arrangement of d.c. coupled wireline links.

A feature of the present invention is the provision of a fault locating arrangement for a two-way repeatered transmission link including first and second spaced two-way terminals and a plurality of two-way repeaters disposed between the first and second terminals comprising: first means disposed in one of the first and second terminals to transmit a unique signal in a first transmission direction from the one of the first and second terminals to the other of the first and second terminals through the plurality of repeaters; second means disposed in at least the other of the first and second terminals and each of the plurality of repeaters, each of the second means being responsive to the unique signal traveling in the first transmission direction to establish a loop connection for the unique signal from the first transmission direction to a second transmission direction opposite to the first transmission direction, to enable transmission of the unique signal in the first transmission direction beyond an associated one of the plurality of repeaters, to break the loop connection when the unique signal is traveling in the second transmission direction and to maintain the loop connection when the unique signal is not traveling in the second transmission direction; and third means disposed in the one of the first and second terminals responsive to the unique signal transmitted in the first transmission direction and received from the second transmission direction to provide an indication of the location of a fault in the transmission link.

The following description will be directed to a fiber optic two-way repeater data transmission link. This description, however, is not intended to limit the fault locating arrangement of this invention to just this type of transmission link since the fault locating arrangement of the present invention can be employed in radio repeatered transmission links and wireline repeatered transmission lnks of both the d.c. coupled and not d.c. coupled types or combinations thereof.

BRIEF DESCRIPTION OF THE DRAWING

Above-mentioned and other features and objects of this invention will become more apparent by reference to the following description taken in conjunction with the accompanying drawing, in which:

FIG. 4 is a block diagram of one possible embodiment of the bit stream generator of FIG. 2;

FIG. 6 is a block diagram of one possible embodiment of the pulse regenerators of FIG. 5; and FIG. 7 is a block diagram of one possible embodiment of the control logic of FIG. 5.

DESCRIPTION OF THE PREFERRED EMBODIMENT

Figure 1:
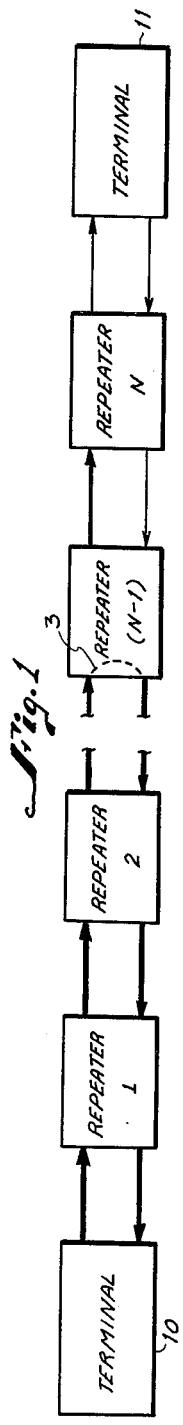
FIG. 1 is a block diagram of a two-way repeatered transmission link illustrating the operation of the fault locating arrangement in accordance with the principles of the present invention.

In accordance with the principles of the present invention, the location of a faulty 8 km (kilometer) section in a two-way repeatered transmission link is done in terminal 10 of FIG. 1. The fault locating arrangement would be placed in operation when a loss of incoming traffic alarm is set. Traffic is then pre-empted and a FSK (frequency shift keyed) 4.608 and 1.152 MHz (megahertz) digital stream is sent out which is keyed every millisecond (msec). This special or unique signal is generated at terminal 10. The above-identified unique signal is only one example of such a unique signal. The unique signal must be unique so as not to be simulated by any normal transmission or traffic signal. It may consist of a signal which is at a unique frequency or has some other data bit pattern which is unique, but which must have a modulation pattern, the parameters of which will be dependent upon other parameters including the distance between repeaters and total line distance.

Means are provided in each repeater half-section (e.g. each direction of transmission in a two-way or duplex repeater) of repeaters 1 to N, to detect the presence of the unique signal. Means are also provided in each of the repeaters 1 to N, such that when the unique signal is detected in a first transmission direction from terminal 10 to terminal 11 but not in the second transmission direction from terminal 11 to terminal 10, the received unique signal will be looped around to the second transmission direction. This can be illustrated by referring to FIG. 1.

A typical fiber optical cable repeatered transmission link is shown including two full-duplex terminals 10 and 11 and a number of full-duplex repeaters 1 to N. Normal traffic would be transmitted in both directions simultaneously, with each direction of transmission in the terminals and repeaters being independent. The dark lines indicate the path of the unique signal used for the fault locating procedure.

If repeater N is not functioning (or if there is a cable break between repeater (N−1) and repeater N) then repeater (N−1) would receive the unique signal in the first transmssion direction only. The internal secondary of the repeater then provides a loop connection to loop the unique signal back as indicated by the dashed line 3 and the signal is transmitted in the second transmission direction to originating terminal 10. The unique signal is always transmitted in the first transmission direction as well as being looped back. This is required because when the unique signal is initially applied to the fiber optic cable, each of the repeaters 1 to N will initially detect the transmission in the first transmission direction only and immediately loop the signal back. That is, when the unique signal first arrives at repeater 1 from terminal 10, it will loop the unique signal back as well as transmit it to repeater 2. When repeater 2 receives the unique signal, it will also loop the unique signal back to repeater 1 and continue transmitting the unique signal in the first transmission direction. Repeater 1, receiving the unique signal from repeater 2, will then break the loop connection and continue acting as two independent repeater sections, processing signals from the two directions. This action will continue down the link, from repeater to repeater, until there is a break in transmission at some pont such as illustrated at repeater (N−1) in FIG. 1. At this point, only repeater (N−1) will be in the looped-back mode and the unique signal will travel the complete distance from terminal 10 to the last working repeater (N−1) and back again to terminal 10.

Terminal 10 includes a means to measure the total transit time of the unique signal through the repeaters and back again and a means to display the result and measurement. The location of the unique signal interruption (failed repeater or broken cable) is calculated by using the propagation delay between repeaters and the total propagation delay of the unique signal. Two special cases must also be considered: (a) If no unique signal is looped back, then the first repeater (repeater 1) has failed or the cable section between terminal 10 and repeater 1 has failed. This is an acceptable condition since it falls within the overall capability of the fault locating arrangement of the present invention to locate a failure within one cable link, and (b) if there are no failures in the system, the total delay will be equivalent to the transit time from terminal 10 to terminal 11 and back to terminal 10. To satisfy this special case, each of the terminals 10 and 11 must have the same loop back capability as the repeaters 1 to N.

Once the last repeater that loops back the unique signal is identified (repeater (N−1) in the example employed), the transmission link fault is known to be in one of the following equipment: (a) one-half of repeater (N−1); (b) repeater N; (c) the 8 km section of the cable between repeaters (N−1) and N; or (d) a connector in the cable section between repeaters (N−1) and N.

Figure 2:
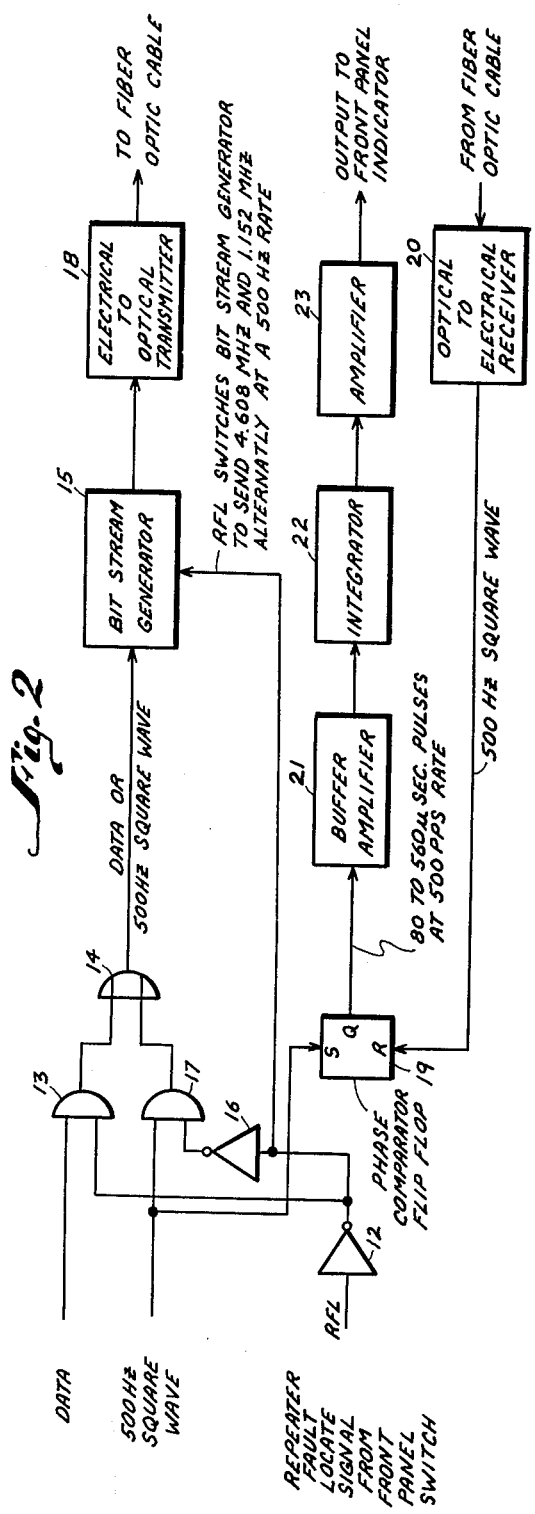
FIG. 2 is a block diagram of one possible embodiment of that portion of the terminal employed in the fault locating arrangement in accordance with the principles of the present invention.

Referring to FIG. 2, there is illustrated therein the circuitry present in terminal 10 of FIG. 1 to generate the unique signal employed for fault location and the circuitry necessary to provide an indication of the location of the fault in the transmission link. As previously mentioned, provisions are made in terminal 10 to provide an indication of a loss of received traffic at terminal 10. Upon this indication an operator would activate a front panel switch to place terminal 10 in a repeater fault locate mode. In the fault locate mode, a unique signal is generated and sent down the cable in the first transmission direction. Each of the repeaters would detect the unique signal and loop it back as described hereinabove. The return signal or the signal received from the second transmission direction is compared for total phase shift corresponding to the delay relative to the transmitted unique signal and an output to a front panel indicator would show the total number of good repeaters in the transmission line before the first faulty repeater or cable section.

When the front panel switch is placed in the fault locate mode, a repeater fault locate signal RFL would have a high value which is coupled through inverter 12 to deactivate AND gate 13 to prevent data input to gate 13 from being transmitted through OR gate 14 to bit stream generator 15. The inverted signal RFL is also coupled through inverter 16 and AND gate 17 for enablng this gate so that a 500 Hz square wave is passed through gate 17 to gate 14 and, hence, to bit stream generator 15. In the fault locate mode bit stream generator 15 would produce a 4.608 MHz squarewave and a 1.152 MHz squarewave alternating at a 1 msec rate. This resulting unique signal is then coupled to electrical to optical transmitter 18 and then to the fiber optic cable. The unique signal then propagates down the cable and is looped back at the most distant good repeater. The total delay per good repeater and cable section is 80 microseconds ($\mu$ secs) plus a few $\mu$ secs for circuit delays. This is based upon 200,000 km/s propagation speed for the optical signal in the cable and a total of 16 km round-trip 8 km cable section.

The total delay of one to seven times 80 $\mu$ secs is measured by generating a pulse with the phase comparator flip flop 19 which receives the looped-back unique signal from optical to electrical receiver 20 coupled to the fiber optic cable. The output from the phase comparator is provided by setting flip flop 19 with the leading edge of the 500 Hz square wave used to generate the unique signal, and resetting flip flop 19 with the received data 500 Hz envelope. The pulses, occurring at a 500 Hz repetition rate, at the output of flip flop 19 are coupled to buffer amplifier 21 and then integrated in integrator 22 and then amplified in amplifier 23 prior to being coupled to a front panel indicator. The output from amplifier 23 will be scaled to provide a full scale indication for the longest delay measured, up to seven good repeaters.

Transmitter 18 may be any known type of electrical to optical converter, such as a gas laser and optical modulator, laser diode or light emitting diode and receiver 20 may be any well-known optical to electrical converter, such as a photodetector diode or avalanche photodiode.

Figure 3:
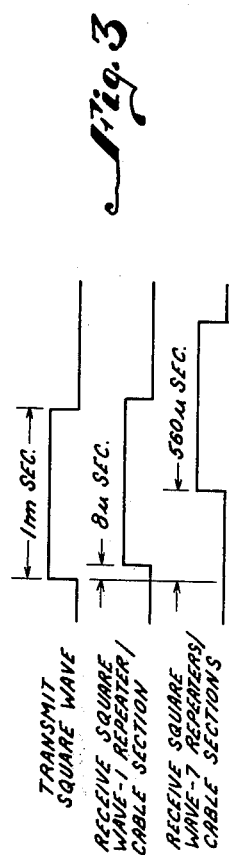
FIG. 3 is a timing diagram illustrating the manner in which a fault is located employing the embodiment of FIG. 2.

FIG. 3 illustrates the transmitted unique signal envelope and the two extremes of the received unique signal envelope utilized to operate phase comparator flip flop 19.

FIG. 4 illustrates one possible embodiment of bit stream generator 15 of FIG. 2. Generator 15 could include a 4.608 MHz pulse generator 24 and a 1.152 MHz pulse generator 24a for use in generating the unique signal and a rate controlled bit stream generator 25 for generating the bit streams used to convey the data when data is coupled from gate 14 to generator 15. The output from generator 24 is coupled to a first input of AND gate 24b having a second input coupled to the output of gate 14. The output of generator 24a is coupled to a first input of AND gate 24c having an inverter input coupled to the output of gate 14. Gate 24b will be enabled and gate 24c will be disabled. When the 500 Hz square wave is high and gate 24b will be disabled and gate 24c will be enabled when the 500 Hz square wave is low resulting in the desired 4.608 and 1.152 MHz digital stream keyed every 1 msec at the output of OR gate 24d. The output from gate 24 is coupled to a first input of AND gate 26 having a second input coupled to the output of gate 14 and a third input coupled to the output of inverter 12 of FIG. 2 which provides the signal RFL. The output of generator 25 is coupled to a first input of AND gate 27 which has its second input coupled to gate 14 and an inverter input coupled to inverter 12 of FIG. 2. When signal RFL is low and data is applied from gate 14, gate 27 will provide a bit stream output modulated by the data which will be coupled through OR gate 28 to transmitter 18. When signal RFL is high indicating that the front panel switch has been moved to the repeater fault locate mode, gate 27 will be inhibited and gate 26 will be enabled when the 500 Hz square wave is high and disabled when the 500 Hz square wave is low resulting in the desired 4.608 and 1.152 MHz bit stream modulated for 1 msec intervals with the resultant unique signal being coupled through gate 28 to transmitter 18.

Figure 5:
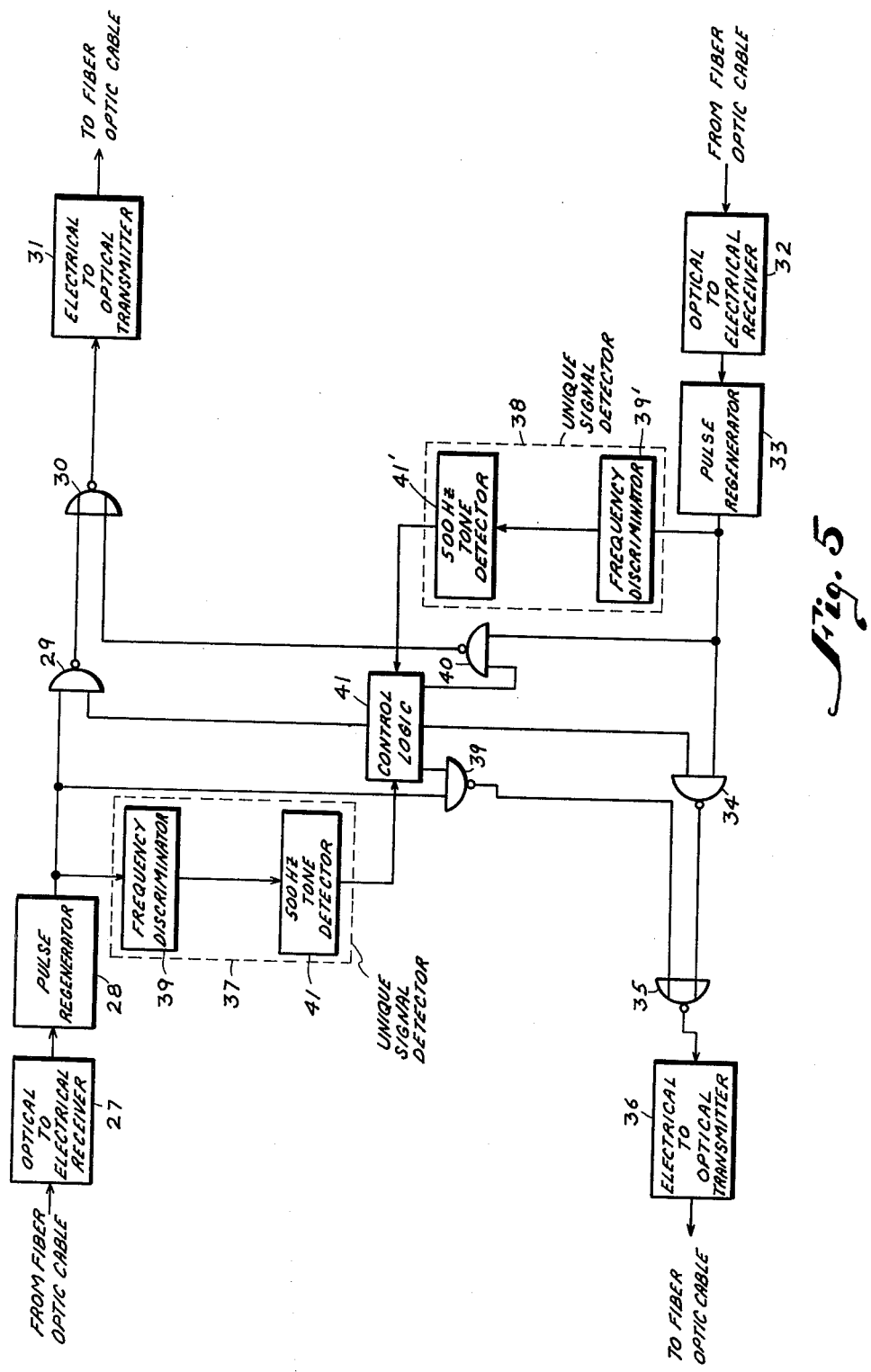
FIG. 5 is a block diagram of one possible embodiment of the repeater of FIG. 1 in accordance with the principles of the present invention.

FIG. 5 is a block diagram of a data rate transparent repeater employed in the transmission link of FIG. 1 incorporating the fault locating circuitry in accordance with the principles of the present invention. The repeater includes an optical to electrical receiver 27, such as an avalanche photodiode (APD), a pulse regenerator 28 to regenerate the signal amplitude of the data signals transmitted from terminal 10, AND gate 29, NOR gate 30 and electrical to optical transmitter 31, such as a laser diode, in the first transmission direction and an identical optical to electrical receiver 32, a pulse regenerator 33, a NAND gate 34, a NOR gate 35 and an electrical to optical transmitter 36 in the second transmission direction. The fault locating circuitry includes unique signal detector 37 coupled to the first direction of transmission, such as at the output of regenerator 28, unique signal detector 38 coupled to the second transmission direction, such as at the output of regenerator 33, NAND gates 39 and 40 and control logic 41.

Unique signal detectors 37 and 38 each include a frequency discriminator or detector 39 and a 500 Hz tone detector 41. The function of detectors 37 and 38 is to detect the 4.608 and 1.152 MHz bit stream when modulated at 500 Hz. When the unique signal in the first transmission direction is detected by detector 37, control logic 41 controls gate 29 to route the unique signal through gates 29 and 30 and transmitter 31 to the fiber optical cable and controls gate 39 to provide the loop connection for the unique signal when no unique signal is detected in the second direction of transmission by detector 38. When the unique signal is detected by detector 38, control logic 41 breaks the loop connection by inhibiting gate 39 and the signals pass through the repeater in the normal manner. The inverse action occurs if the repeater is tested for a fault from terminal 11 rather than terminal 10 with control logic 41 controlling NAND gate 40 to provide the loop connection.

Referring to FIG. 6, there is illustrated therein a block diagram of the circuitry of each of regenerators 28 and 33 of the repeater of FIG. 5. Each of regenerators 28 and 33 include a transimpedance bipolar transistor front end 42, an AGC controlled wideband amplifier 43, a filter 44, a wideband amplifier 45, a balanced clamp and high signal comparator 46, an AGC amplifier 47 and a receiver power supply 48. The signal detected by an APD receiver 27 has maximum sensitivity and is applied as an input to front end 42 which provides high performance and yet high stability and low power. The output of front end 42 is coupled to amplifier 43 then to filter 44 and finally a high level wideband amplifier 45. Filter 44 further limits the bandwidth and shapes the frequency response of the regenerator to reduce noise and minimize time jitter. The filter could have been placed at any pont in the signal path before the input to comparator 46, however, there are distinct advantages to the position illustrated. For example, if filter 44 were located directly after front end 42, adjustment of filter 44 would effect the load impedance of front end 42. The reverse is also true. On the other hand, if filter 44 were placed after amplifier 45 and before comparator 46, filter 44 would be on a balanced signal path requiring a more complex and balanced filter. In the locaton shown, filter 44 is isolated from loading effects by amplifiers 43 and 45.

Amplifier 45 serves two functions. First amplifier 45 provides additional linear amplification to the incoming signal, and secondly, it provides a balanced signal to the clamp and comparator 46. Automatic gain control is not applied to amplifier 45 because it operates at a higher signal level than amplifier 43. Automatic gain control over large signal levels is considerably more difficult than control over lower level signals, since distortion is more likely to occur as the gain of a high signal level stage is changed. If considerable dynamic range was required, then automatic gain control of amplifier 45 would also be required. In this instance without automatic gain control, the high signal levels would cause distortion.

The nature of the level adaptive balanced clamp circuit of clamp and comparator 46 requires converting the ground referenced signal to a balanced line signal. The signal could be processed from amplifier 43 in a balanced configuration. That would have reduced the shielding requirement and reduced the effects of ground loops. Such a configuration would, however, be considerably more complex and would not conserve power.

The signal provided to the balanced clamp of clamp and comparator 46 is of sufficient amplitude for presentation to the comparator of clamp and comparator 46, however, there was no d.c. ground reference with which to compare it. That is, the binary "0" state of either line is the lowest or highest voltage to which that line is driven under any given signal level. This minimum voltage is defined not only by the amplitude of the incoming signal, but also by the amplifier quiescent bias. Both the bias of amplifier 45 and the signal level were variables to some extent and, therefore, the common practice of comparing the incoming signal (single-ended) to a fixed voltage reference would not have been satisfactory. The effects of bias changes could have been eliminated by subsequent peak detection. However, since the voltage drops across the clamp and peak detector diodes would be significant compared to the signal level, the dynamic range with this approach would be limited. Greater dynamic range than that possible with clamping and peak detection is achieved with balanced clamping. For this approach, the two incoming lines are clamped at the peak excursions, and then compared to each other.

Control logic 41 of FIG. 5 can be any appropriate combination of logic gates that will respond to the output of detectors 37 and 38 to control gates 29, 34, 39 and 40 to carry out the fault locating function in accordance with the principles of the present invention. One particular combination of gates that can be used in control logic 41 is illustrated in Block form in FIG. 7 and includes an EXCLUSIVE-OR gate 52 and a NOT gate 53.

While we have described above the principles of our invention in connection with specific apparatus it is to be clearly understood that this description is made only by way of example and not as a limitation to the scope of our invention as set forth in the objects thereof and in the accompanying claims.

We claim:

1. A fault locking arrangement for a two-way repeatered transmission link including first and second spaced two-way terminals and a plurality of two-way repeaters disposed between said first and second terminals comprising:

first means disposed in one of said first and first transmission direction from said one of said first and second terminals to the other of said first and second terminals through said plurality of repeaters;

second means disposed in at least said other of said first and second terminals and each of said plurality of repeaters, each of said second means being responsive to said unique signal traveling in said first transmission direction to establish a loop connection for said unique signal from said first transmission direction to a second transmission direction opposite to said first transmission direction, to enable transmission of said unique signal in said first transmission direction beyond an associated one of said plurality of repeaters, to break said loop connection when said unique signal is traveling in said second transmission direction and to maintain said loop connection when said unique signal is not traveling in said second transmission direction; and third means disposed in said one of said first and second terminals responsive to said unique signal transmitted in said first transmission direction and received from said second transmission direction to provide an indication of the location of a fault in said transmission link.

2. An arrangement according to claim 1, wherein said first means includes fourth means to generate a bit stream having at least a first given rate modulated at a second given rate different than said first given rate to provide said unique signal.

3. An arrangement according to claim 2, wherein said second means includes a first unique signal detector coupled to said first transmission direction, a second unique signal detector coupled to said second transmission direction, and logic circuitry coupled to said first and second unique signal detectors and said first and second transmission directions to provide said loop connection, to enable transmission of said unique signal in said first transmission direction beyond said associated one of said plurality of repeaters, to break said loop connection and to maintain said loop connection.

4. An arrangement according to claim 3, wherein each of said first and second unique signal detectors include a frequency discriminator coupled to an associated one of said first and second transmission directions, and a tone detector having an operating frequency corresponding to said second given rate coupled to said discriminator and said logic circuitry.

5. An arrangement according to claim 4, wherein said logic circuitry includes a frst NAND gate coupled to an input of said associated one of said plurality of repeaters in said first transmission direction, a first NOR gate coupled between the output of said first NAND gate and an output of said associated one of said plurality of repeaters in said first transmission direction, a second NAND gate coupled to an input of said associated one of said plurality of repeaters in said second transmission direction, a second NOR gate coupled between the output of said second NAND gate and an output of said associated one of said plurality of repeaters in said second transmission direction, a third NAND gate coupled between said input of said associated one of said plurality of repeaters in said first transmission direction and an input of said first NOR gate, and control logic coupled to each of said tone detector and each of said first, second and third NAND gates for control thereof.

6. An arrangement according to claim 5, wherein said logic circuitry further includes a fourth NAND gate coupled to said control logic and between said input of said associated one of said plurality of repeaters in said second transmission direction and an input of said second NOR gate, said fourth NAND gate providing an additional loop connection if said unique signal originates at said other of said first and second terminals rather than said one of said first and second terminals.

7. An arrangement according to claim 6, wherein said control logic includes an EXCLUSIVE-OR gate coupled to each of said tone detectors, and a NOT gate coupled to said EXCLUSIVE-OR gate and each of said first, second, third and fourth NAND gates.

8. An arrangement according to claim 3, wherein said logic circuitry includes a first NAND gate coupled to an input of said associated one of said plurality of repeaters in said first transmission direction, a first NOR gate coupled between the output of said first NAND gate and an output of said associated one of said plurality of repeaters in said first transmission direction, a second NAND gate coupled to an input of said associated one of said plurality of repeaters in said second transmission direction, a second NOR gate coupled between the output of said second NAND gate and an output of said associated one of said plurality of repeaters in said second transmission direction, a third NAND gate coupled between said input of said associated one of said plurality of repeaters in said first transmission direction and an input of said first NOR gate, and control logic coupled to each of said first and second unique signal detectors and each of said first, second and third NAND gates for control thereof.

9. An arrangement according to claim 3, wherein said third means includes a phase comparator coupled to said fourth means and an input of said one of said first and second terminals responsive to said unique signal transmitted from said one of said first and second terminals and said unique signal received at said one of said first and second terminals to provide said indication.

10. An arrangement according to claim 9, wherein said phase comparator includes a flip flop set by the leading edge of said unique signal transmitted from said one of said first and second terminals and reset by the leading edge of said unique signal received at said one of said first and second terminals.

11. An arrangement according to claim 10, wherein said flip flop is an RS type of flip flop.

12. An arrangement according to claim 1, wherein said second means includes a first unique signal detector coupled to said first transmission direction, a second unique signal detector coupled to said second transmission direction, and logic circuitry coupled to said first and second unique signal detectors and said first and second transmission directions to provide said loop connection, to enable transmission of said unique signal in said first transmission direction beyond said associated one of said plurality of repeaters, to break said loop connection and to maintain said loop connection.

13. An arrangement according to claim 12, wherein said logic circuitry includes a first NAND gate coupled to an input of said associated one of said plurality of repeaters in said first transmission direction, a first NOR gate coupled between the output of said first NAND gate and an output of said associated one of said plurality of repeaters in said first transmission direction, a second NAND gate coupled to an input of said associated one of said plurality of repeaters in said second transmission direction, a second NOR gate coupled between the output of said second NAND gate and an output of said associated one of said plurality of repeaters in said second transmission direction, a third NAND gate coupled between said input of said associated one of said plurality of repeaters in said first transmission direction and an input of said first NOR gate, and control logic coupled to each of said first and second unique signal detectors and each of said first, second and third NAND gates for control thereof.

14. An arrangement according to claim 12, wherein said third means includes a phase comparator coupled to said first means and an input of said one of said first and second terminals responsive to said unique signal transmitted from said one of said first and second terminals and said unique signal received at said one of said first and second terminals to provide said indication.

15. An arrangement according to claim 14, wherein said phase comparator includes a flip flop set by the leading edge of said unique signal transmitted from said one of said first and second terminals and reset by the leading edge of said unique signal received at said one of said first and second terminals.

16. An arrangement according to claim 15, wherein said flip flop is an RS type of flip flop.

17. An arrangement according to claim 1, wherein said third means includes a phase comparator coupled to said first means and an input of said one of said first and second terminals responsive to said unique signal transmitted from said one of said first and second terminals and said unique signal received at said one of said first and second terminals to provide said indication.

18. An arrangement according to clam 17, wherein said phase comparator includes a flip flop set by the leading edge of said unique signal transmitted from said one of said first and second terminals and reset by the leading edge of said unique signal received at said one of said first and second terminals.

19. An arrangement according to claim 18, wherein said flip flop is an RS type of flip flop.

* * * * *